US005839334A

United States Patent [19]

Yoshimura

[11] Patent Number: 5,839,334

[45] Date of Patent: Nov. 24, 1998

[54] ORNAMENTAL ARTICLE AND METHOD OF PRODUCING THE SAME

[76] Inventor: Ichiro Yoshimura, 43-6, Shimizu-cho, Itabashi-ku, Tokyo, Japan

[21] Appl. No.: 789,265

[22] Filed: Jan. 28, 1997

[30] Foreign Application Priority Data

Apr. 26, 1996 [JP] Japan .................................... 8-129246

[51] Int. Cl.$^6$ ........................................ B23B 1/00

[52] U.S. Cl. .................................... 82/1.11; 82/18; 82/47; 82/101; 29/418

[58] Field of Search ................................ 82/1.11, 18, 46, 82/47, 101, 162; 29/527.6, 557, 559, 560.1, DIG. 30, DIG. 9, DIG. 10, DIG. 19, DIG. 55, DIG. 57, 418, 423

[56] References Cited

U.S. PATENT DOCUMENTS 2,268,983 1/1942 Gilmore et al. .......................... 82/1.11
2,285,583 6/1942 Jennings et al. .......................... 82/1.11
3,064,531 11/1962 Bullock .................................... 82/1.11
4,406,189 9/1983 Neefe ....................................... 82/1.11

*Primary Examiner*—Andrea L. Pitts
*Assistant Examiner*—Henry W. H. Tsai
*Attorney, Agent, or Firm*—Sughrue, Mion, Zinn, Macpeak & Seas, PLLC

[57] ABSTRACT

The invention provides an ornamental article which can be produced readily in a mass together at a low cost without requiring a special skill and a production method therefor. The ornamental article is produced by fixing a base plate element having a three-dimensional pattern portion formed integrally thereon, to a chucking member for a lathe such that the three-dimensional pattern portion is fittably received in a complementary receiving portion of the chucking member, rotating the chucking member, and machining the base plate element by means of a cutting tool to remove the material of the base plate element until a boundary plane between the base plate element and the three-dimensional pattern portion is reached. The three-dimensional pattern portion of the ornamental article produced has an outer peripheral portion whose thickness gradually decreases toward an outer peripheral edge thereof so as to define an outer periphery contour line without exhibiting a steeply rising end face. When the ornamental article is attached to an object article, the three-dimensional pattern portion exhibits a continuous appearance to an outer face of the object article.

3 Claims, 8 Drawing Sheets

ORNAMENTAL ARTICLE AND METHOD OF PRODUCING THE SAME

BACKGROUND OF THE INVENTION

1. Field of the Invention

This invention relates to an ornamental article which is, in use, attached to an outer face of a various article such as a personal article such as a cigarette lighter, a compact or a buckle of a belt, a various receptacle, a business machine or tool, household goods, or a building material and a method of producing the same.

2. Description of the Related Art

An ornamental article of the type mentioned above is usually produced, for example, in the following manner. Referring to FIGS. 10 to 13, the ornamental article shown is denoted at a and is formed from a metal material such as copper or zinc. The ornamental article a is produced by a process including a step in which a three-dimensional pattern portion 2 of a pattern of an animal or a plant, a geometrical pattern or some other pattern is first formed integrally on a surface of a metal base plate element 1 and then an outer side portion 1' of the metal base plate element 1 is removed along a contour of the three-dimensional pattern portion 2, and another step in which perforation portions 3' are removed along contours of perforations 3 provided in the three-dimensional pattern portion 2.

The removal of the outer side portion 1' and the perforation portions 3' is usually performed by press work. Consequently, a trimming die which fits each of the portions to be removed must naturally be prepared and usually a number of working operations equal to the number of portions to be removed are required (removal of some perforation portions 3', that is, piercing, is sometimes performed by cutting away a material by means of a saw member). Therefore, a high cost is required.

Besides, since the three-dimensional pattern portion 2 of the ornamental article a normally has a complicated, intricate and delicate configuration and includes a correspondingly large number of perforations 3, a particularly high skill is required for piercing for removal of the perforations 3.

The ornamental article a exhibits an ornamenting effect actually at the three-dimensional pattern portion 2 thereof which is attached to an outer face of an object article, and only this is required for the ornamental article a. Therefore, it is preferable that the ornamental article a in its final form be free from the metal base plate element 1. Conversely, if the metal base plate element 1 is present on the ornamental article a, the thickness t of the metal base plate element 1 is exposed to the outer face f of the object article (FIGS. 11 and 12), which deteriorates the appearance of the ornamental article a.

However, the thickness t of the metal base plate element 1 having the three-dimensional pattern portion 2 formed on the surface thereof is essentially required to allow the metal base plate element 1 to be grasped by a chucking element when an operation for removing the perforation portions 3', that is, a piercing operation, or some other operation is performed. Thus, due to the thickness t of the metal base plate element 1, it cannot be avoided that the ornamental article a attached to the outer face f of the object article becomes thick and gives a deteriorated appearance.

SUMMARY OF THE INVENTION

It is an object of the present invention to provide an ornamental article which is formed only from a three-dimensional pattern portion and can be produced readily in a mass together with required perforations at a low cost without requiring a special skill and a suitable method of producing the ornamental article.

In order to attain the object described above, according to an aspect of the present invention, there is provided a method of producing an ornamental article, comprising the steps of fixing a base plate element, which has a three-dimensional pattern portion of a pattern of an animal or a plant, a geometrical pattern or some other pattern formed integrally on a surface thereof, to a chucking member, on which a fitting recess having formed on a bottom face thereof a receiving portion complementary in shape to the three-dimensional pattern portion of the base plate element is formed, for a lathe such that the three-dimensional pattern portion of the base plate element is fittably received in the receiving portion of the chucking member, rotating the chucking member to rotate the base plate element, and machining the base plate element by means of a cutting tool to remove the material of the base plate element until a boundary plane between the base plate element and the three-dimensional pattern portion is reached.

With the method, only if a base plate element and a complementary chucking member of the configurations described above are prepared, by performing the three steps described above which are ordinary steps performed with a lathe, an intended ornamental article can be produced readily in a mass at a lower cost than ever without requiring a special skill.

Preferably, the base plate element has a surrounding recessed groove formed along an outer peripheral edge of the three-dimensional pattern portion in advance with such a depth that a bottom thereof is aligned with the boundary plane. In this instance, when the steps described above are applied to the base plate element, the three-dimensional pattern portion is put into a separate condition from the base plate element, thereby obtaining an intended ornamental article.

Preferably, the three-dimensional pattern portion has a plurality of recesses for formation of perforations formed at inner portions thereof in advance with such a depth that bottoms thereof are aligned with the boundary plane. In this instance, an intended ornamental article which has desired perforations can be produced readily with certainty by applying the steps described above.

According to another aspect of the present invention, there is provided an ornamental article, comprising a three-dimensional pattern portion of a pattern of an animal or a plant, a geometrical pattern or some other pattern, the three-dimensional pattern portion having an outer peripheral portion whose thickness gradually decreases toward an outer peripheral edge thereof so as to define an outer periphery contour line without exhibiting a steeply rising end face.

With the ornamental article, since the three-dimensional pattern portion has the outer peripheral portion whose thickness gradually decreases toward an outer peripheral edge thereof so as to define an outer periphery contour line without exhibiting a steeply rising end face, when the ornamental article is attached to an outer face of an object article, the three-dimensional pattern portion thereof exhibits a continuous appearance to the outer face of the object article, thereby presenting a good appearance to the ornamental article and the object article.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
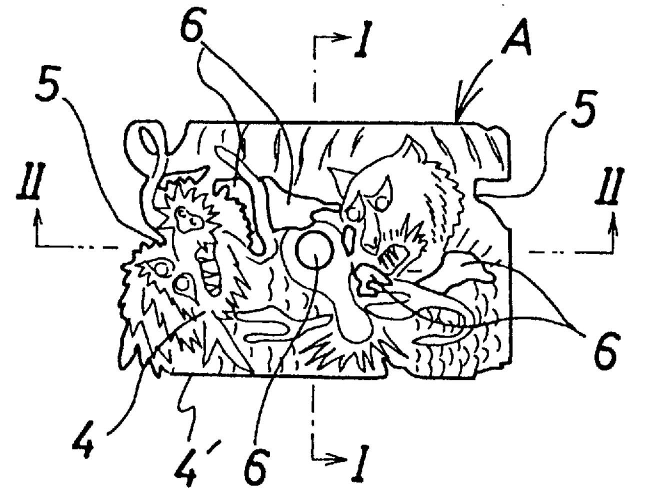
FIG. 1 is a plan view of an ornamental article to which the present invention is applied.
Figure 2:
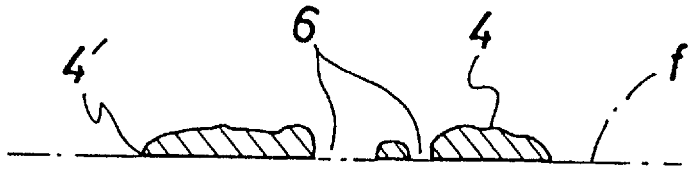
FIG. 2 is a sectional view taken along line I—I of FIG. 1.
Figure 3:
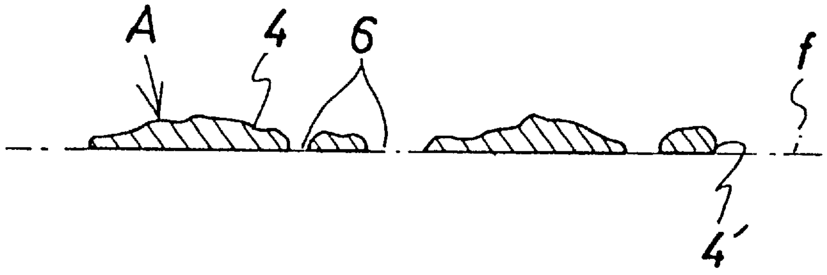
FIG. 3 is a sectional view taken along line II—II of FIG. 1.
Figure 4:
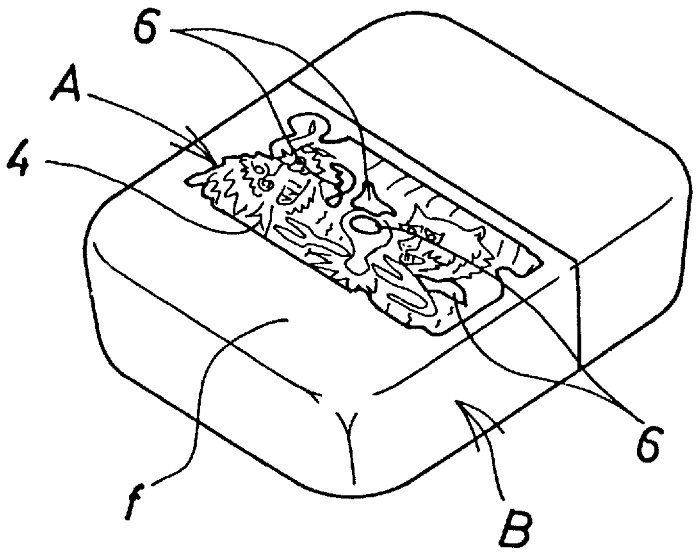
FIG. 4 is a perspective view of a cigarette lighter to which the ornamental article of FIG. 1 is attached.
Figure 5:
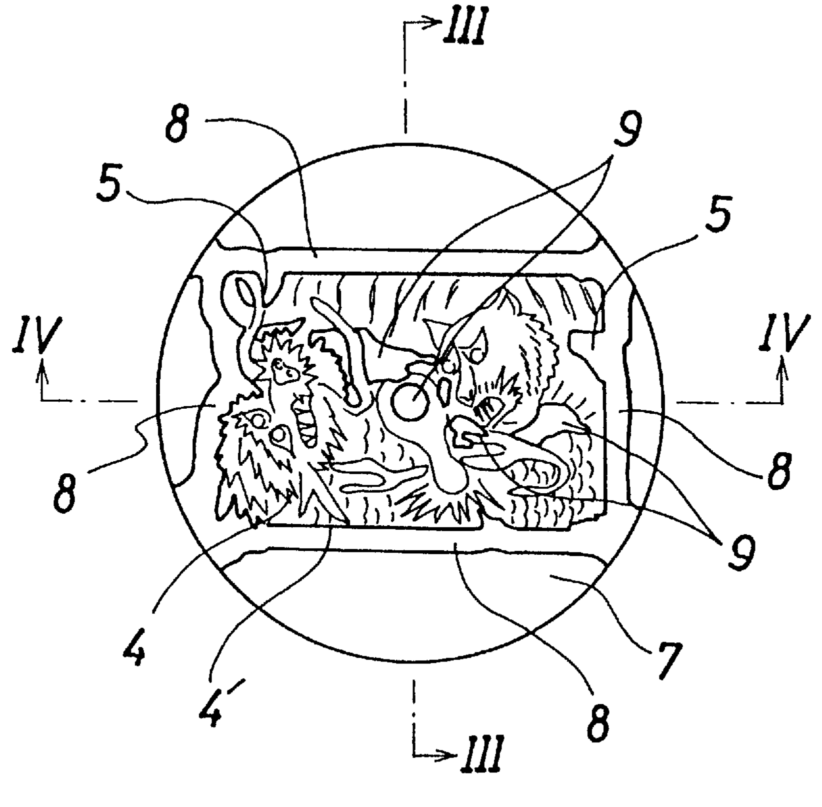
FIG. 5 is a plan view of a base plate element on which a three-dimensional pattern portion is formed integrally in a process of production of the ornamental article of FIG. 1.
Figure 6:
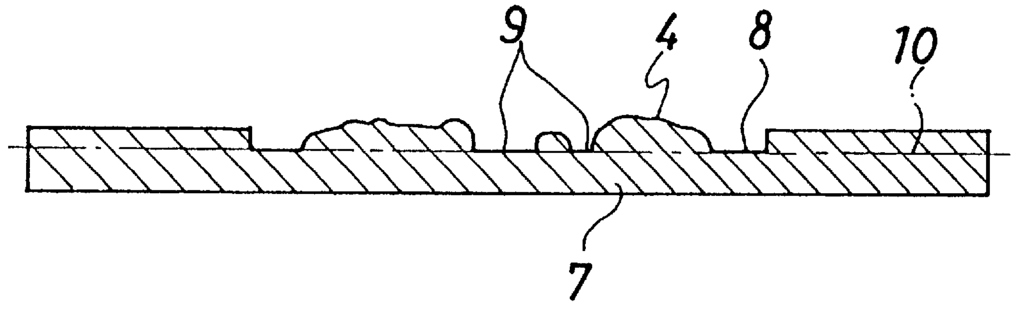
FIG. 6 is a sectional view taken along line III—III of FIG. 5.
Figure 7:
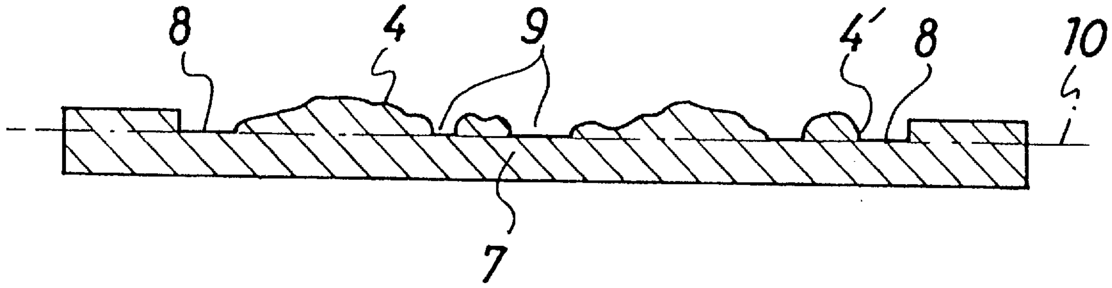
FIG. 7 is a sectional view taken along line IV—IV of FIG. 5.
Figure 8:
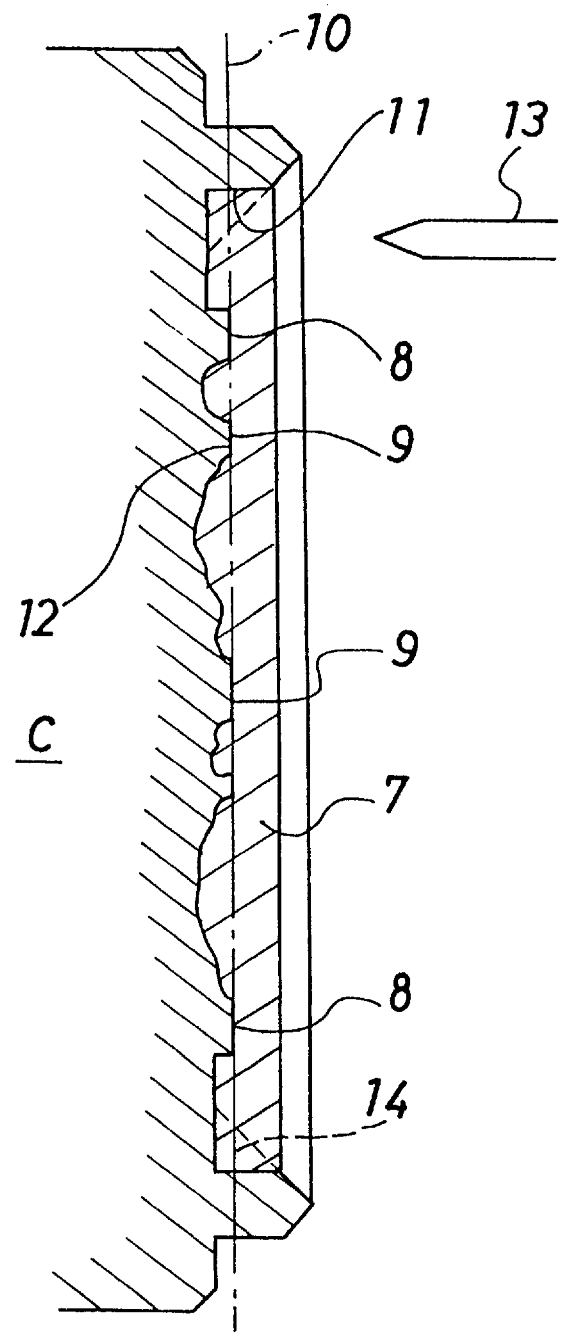
FIG. 8 is a detailed partial sectional view of the base plate element of FIG. 5 when it is machined using a lathe.

FIGS. 1 to 3 show an ornamental article to which the present invention is applied, and FIG. 4 shows a cigarette lighter to which the ornamental article is attached.

Referring to FIGS. 1 to 4, the ornamental article shown is denoted at A and is made of a metal material such as copper or zinc. The ornamental article A has a three-dimensional pattern portion 4 of a pattern of an animal or a plant, a geometrical pattern or some other pattern. The three-dimensional pattern portion 4 has an outer peripheral contour line of a substantially rectangular shape in plan, and notched or cut-out portions 5 of required shapes are formed at portions of the outer peripheral contour line of the three-dimensional pattern portion 4 while a plurality of perforations 6 having required shapes are provided at inner portions of the three-dimensional pattern portion 4.

An outer peripheral edge 4' of the three-dimensional pattern portion 4 does not exhibit such a steeply rising end face as may be formed when cut by means of a blade (even if a partially steeply rising end edge remains, this is very small and does not deteriorate the appearance of the ornamental article A), but exhibits a gradually decreasing thickness toward the edge on the outer periphery contour line.

The ornamental article A is attached to an outer face f of a cigarette lighter B by brazing or some other suitable means. The pattern represented by the three-dimensional pattern portion 4 exhibits a continuous appearance to a face of the three-dimensional pattern portion 4 at which the three-dimensional pattern portion 4 is attached to the outer face of the cigarette lighter B.

A method of producing the ornamental article A according to the present invention will be described below with reference to FIGS. 5 to 9.

A circular metal base plate element 7 is made of a metal material such as copper or zinc and has a three-dimensional pattern portion 4 of a pattern of an animal or a plant, a geometrical pattern or some other pattern formed integrally on a surface thereof.

A surrounding recessed groove 8 is formed along an outer peripheral edge 4' of the three-dimensional pattern portion 4. The outer peripheral edge 4' has several cut-out portions 5 of required shapes formed partially thereon, and a plurality of recesses 9 for formation of perforations of required shapes are formed at inner portions of the three-dimensional pattern portion 4.

The surrounding recessed groove 8 and the recesses 9 for formation of perforations are formed such that the bottom faces thereof are aligned on a boundary plane 10 between the three-dimensional pattern portion 4 and the metal base plate element 7.

A chucking member C for a lathe has a fitting recess 11, and a receiving portion 12 complementary in shape to the three-dimensional pattern portion 4 so that it can fittably receive the three-dimensional pattern portion 4 therein is formed in a recessed condition on the bottom face of the fitting recess 11.

Figure 9:
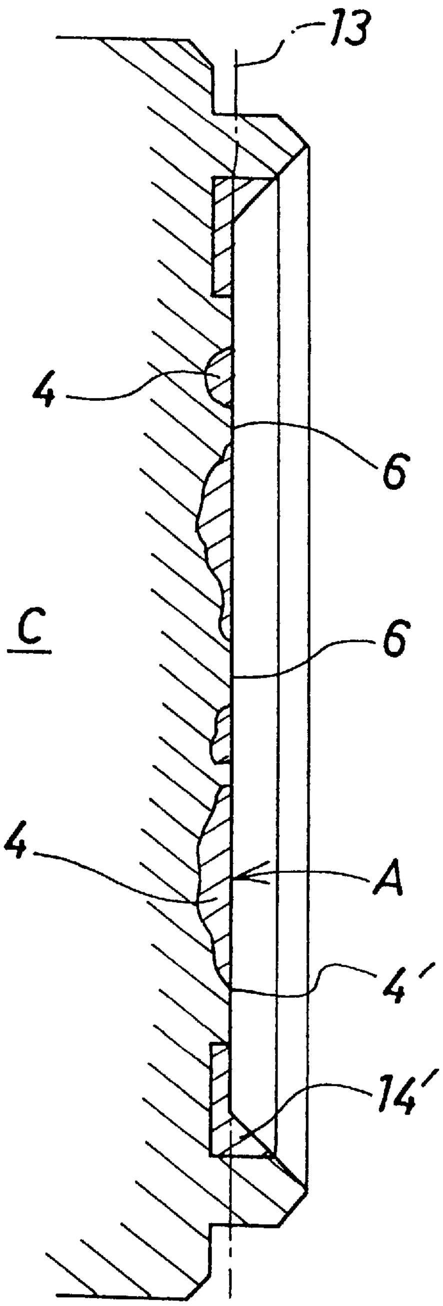
FIG. 9 is a similar view but showing the base plate element of FIG. 5 after the machining in FIG. 5 is completed.
Figure 10:
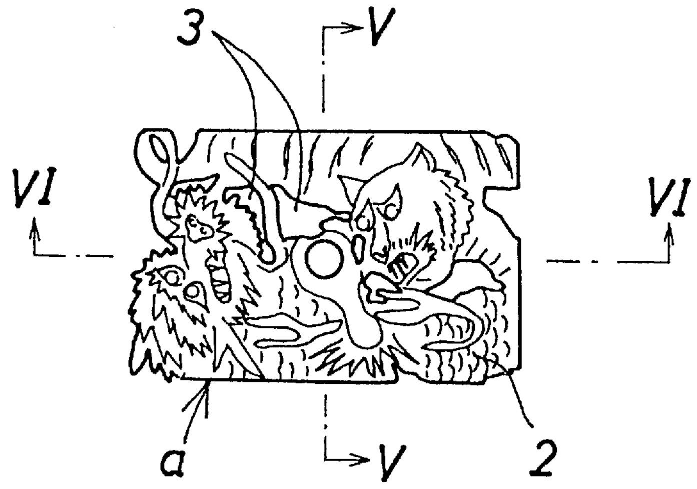
FIG. 10 PRIOR ART
FIG. 10 is a plan view of an ornamental article produced by a known production method.
Figure 11:
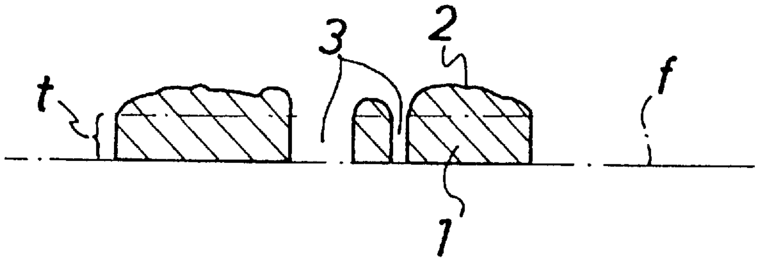
FIG. 11 PRIOR ART
FIG. 11 is a sectional view taken along line V—V of FIG. 10.
Figure 12:
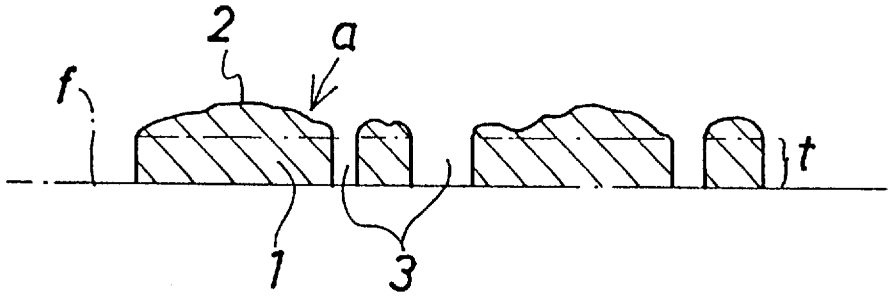
FIG. 12 PRIOR ART
FIG. 12 is a sectional view taken along line VI—VI of FIG. 10.
Figure 13:
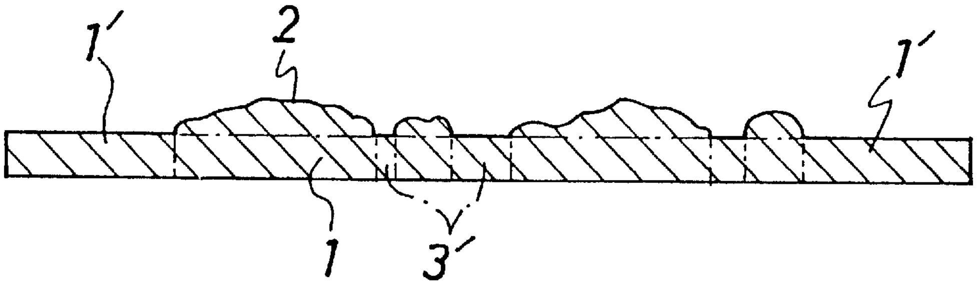
FIG. 13 PRIOR ART
FIG. 13 is a sectional view of a base plate element on which a three-dimensional pattern portion prepared to produce the ornamental article of FIG. 10 is formed integrally.

In production, the metal base plate element 7 is first fitted into and fastened to the fitting recess 11 such that the three-dimensional pattern portion 4 is received in position by the receiving portion 12, and then the chucking member C is rotated to rotate the metal plate portion so that the metal base plate element 7 is machined, at a portion thereof on the inner side of an outer peripheral portion 14, to the boundary plane 10 between the three-dimensional pattern portion 4 and the metal base plate element 7 leaving the outer peripheral portion 14 in an annular shape (FIG. 9).

Consequently, the three-dimensional pattern portion 4 of the metal base plate element 7 is put into a separate independent condition while leaving the outer peripheral portion 14 on the outer side of the three-dimensional pattern portion 4 as an annular ring 14', and the recesses 9 for formation of perforations of the three-dimensional pattern portion 4 are opened as the perforations 6, thereby obtaining the ornamental article A (FIG. 1).

Thus, according to the method of production described above, while the metal base plate element 7 having the three-dimensional pattern portion 4 of a pattern of an animal or a plant, a geometrical pattern or some other pattern formed integrally on a surface thereof is grasped firmly by the chucking member C, required machining is performed to separate the three-dimensional pattern portion 4 in which the perforations 6 are opened thereby to obtain the intended ornamental article A.

It is to be noted that, while the ornamental article A in the embodiment described above is made of a metal material, the present invention can be applied not only to ornamental articles made of metal materials but also to ornamental articles made of other materials such as wood, synthetic resins or synthetic rubbers.

In summary, since the three-dimensional pattern portion 4 has the outer peripheral portion (14) whose thickness gradually decreases toward an outer peripheral edge 4' thereof so as to define an outer periphery contour line without exhibiting a steeply rising end face, when the ornamental article is attached to an outer face of an object article, the three-dimensional pattern portion 4 thereof exhibits a continuous appearance to the outer face of the object article, thereby presenting a good appearance to the ornamental article and the object article.

The ornamental article can be produced readily and with certainty by fixing a base plate element 7, which has a three-dimensional pattern portion 4 formed integrally on a surface thereof, to a chucking member C, on which a fitting recess 11 having formed on a bottom face thereof a receiving portion 12 complementary in shape to the three-dimensional pattern portion 4 of the base plate element 7 is formed, for a lathe such that the three-dimensional pattern portion 4 of the base plate element 7 is fittably received in the receiving portion 12 of the chucking member C, rotating the chucking member C to rotate the base plate element 7, and machining the base plate element 7 by means of a cutting tool 13 to remove the material of the base plate element 7 until a boundary plane 10 between the base plate element 7 and the three-dimensional pattern portion 4 is reached.

Having now fully described the invention, it will be apparent to one of ordinary skill in the art that many changes and modifications can be made thereto without departing from the spirit and scope of the invention as set forth herein.

What is claimed is:

1. A method of producing an ornamental article, comprising the steps of:

providing a base plate element with a three-dimensional pattern portion formed integrally on a surface thereof;

providing a chucking member having a fitting recess, said fitting recess having a bottom face with a receiving portion formed thereon, said receiving portion complementary in shape to said three-dimensional pattern portion;

fitting said three-dimensional pattern portion of said base plate element into said receiving portion of said chucking member;

fixing said base plate element to said chucking member to prevent a relative movement therebetween;

rotating said chucking member to rotate said base plate element; and using a tool to remove a material of said base plate element until reaching a boundary plane between said base plate element and said three-dimensional pattern portion.

2. A method of producing an ornamental article as claimed in claim 1, further comprising the step of providing said base plate element with a surrounding recessed groove along an outer peripheral edge of said three-dimensional pattern portion before said fitting step, said surrounding recessed groove having a depth such that a bottom thereof is aligned with said boundary plane.

3. A method of producing an ornamental article as claimed in claim 1 or 2, further comprising the step of providing said three-dimensional pattern portion with a recess at an inner portion thereof before said fitting step, said recess having a depth such that a bottom thereof is aligned with said boundary plane.

* * * * *